US008534138B2

(12) United States Patent
Gottlieb et al.

(10) Patent No.: US 8,534,138 B2
(45) Date of Patent: *Sep. 17, 2013

(54) CHORDAL GAS FLOWMETER WITH TRANSDUCERS INSTALLED OUTSIDE THE PRESSURE BOUNDARY, HOUSING AND METHOD

(75) Inventors: Emanuel J. Gottlieb, Upper St. Clair, PA (US); Donald R. Augenstein, Pittsburgh, PA (US); William R. Freund, Jr., Moon Township, PA (US); Richard A. Zuckerman, Pittsburgh, PA (US); Herbert Estrada, Annapolis, MD (US); Calvin R. Hastings, Mt. Lebanon, PA (US)

(73) Assignee: Cameron International Corporation, Houston, TX (US)

( * ) Notice: Subject to any disclaimer, the term of this patent is extended or adjusted under 35 U.S.C. 154(b) by 153 days.

This patent is subject to a terminal disclaimer.

(21) Appl. No.: 13/068,772

(22) Filed: May 19, 2011

(65) Prior Publication Data
US 2012/0125122 A1 May 24, 2012

Related U.S. Application Data

(63) Continuation-in-part of application No. 12/927,616, filed on Nov. 19, 2010.

(51) Int. Cl.
*G01F 1/66* (2006.01)
(52) U.S. Cl.
USPC ....................................................... 73/861.28
(58) Field of Classification Search
USPC ....................................................... 73/861.28
See application file for complete search history.

(56) References Cited

U.S. PATENT DOCUMENTS

| | | | |
|---|---|---|---|
| 4,024,760 A | 5/1977 | Estrada, Jr. |
| 4,103,551 A | 8/1978 | Lynnworth |
| 5,179,862 A | 1/1993 | Lynnworth |
| 5,515,733 A | 5/1996 | Lynnworth |
| 5,962,790 A | 10/1999 | Lynnworth et al. |
| 6,279,379 B1 | 8/2001 | Logue et al. |
| 6,343,511 B1 | 2/2002 | Lynnworth et al. |

(Continued)

OTHER PUBLICATIONS

U.S. Appl. No. 12/927,616, Emanuel Gottlieb, filed Nov. 19, 2010.*

*Primary Examiner* — Jewel V Thompson
(74) *Attorney, Agent, or Firm* — Ansel M. Schwartz

(57) ABSTRACT

A flowmeter for detecting gas flow rates in a pipe includes a container configured to be attached to the pipe having a channel through which the gas flows, and a plurality of recesses that extend through the container and a plurality of housings. Each recess has a housing which contains pressure in the channel. Each housing has a window that is in acoustic communication with the channel. The flowmeter includes a plurality of transducers, with one transducer of the plurality of transducers disposed in each recess. The transducers transmit ultrasonic signals into and receive ultrasonic signals from the channel through the window in the housing in which a transducer is disposed. The flowmeter includes a controller in electrical communication with the plurality of transducers which determines the gas flow rate through the channel by measuring transit times of signals transmitted by and received by the transducers. A housing for an ultrasonic transducer for a flowmeter which is inserted into a recess of a container that acoustically isolates the housing from the container. A method for detecting gas flow rates in a pipe. A transducer for an ultrasonic flowmeter.

28 Claims, 8 Drawing Sheets

(56) References Cited

U.S. PATENT DOCUMENTS

| | | |
|---|---|---|
| 6,354,146 B1 | 3/2002 | Birchak et al. |
| 7,093,502 B2 | 8/2006 | Kupnik et al. |
| 7,152,490 B1 | 12/2006 | Freund et al. |
| 7,628,081 B1 | 12/2009 | Feller |
| 7,911,306 B2 | 3/2011 | Allen |
| 8,132,469 B2 | 3/2012 | Allen |
| 8,186,229 B2 | 5/2012 | Allen |
| 2004/0013570 A1 | 1/2004 | Labuda et al. |
| 2007/0062254 A1 | 3/2007 | Gysling et al. |
| 2010/0095782 A1 | 4/2010 | Ferencz et al. |
| 2012/0125122 A1 | 5/2012 | Gottlieb et al. |

* cited by examiner

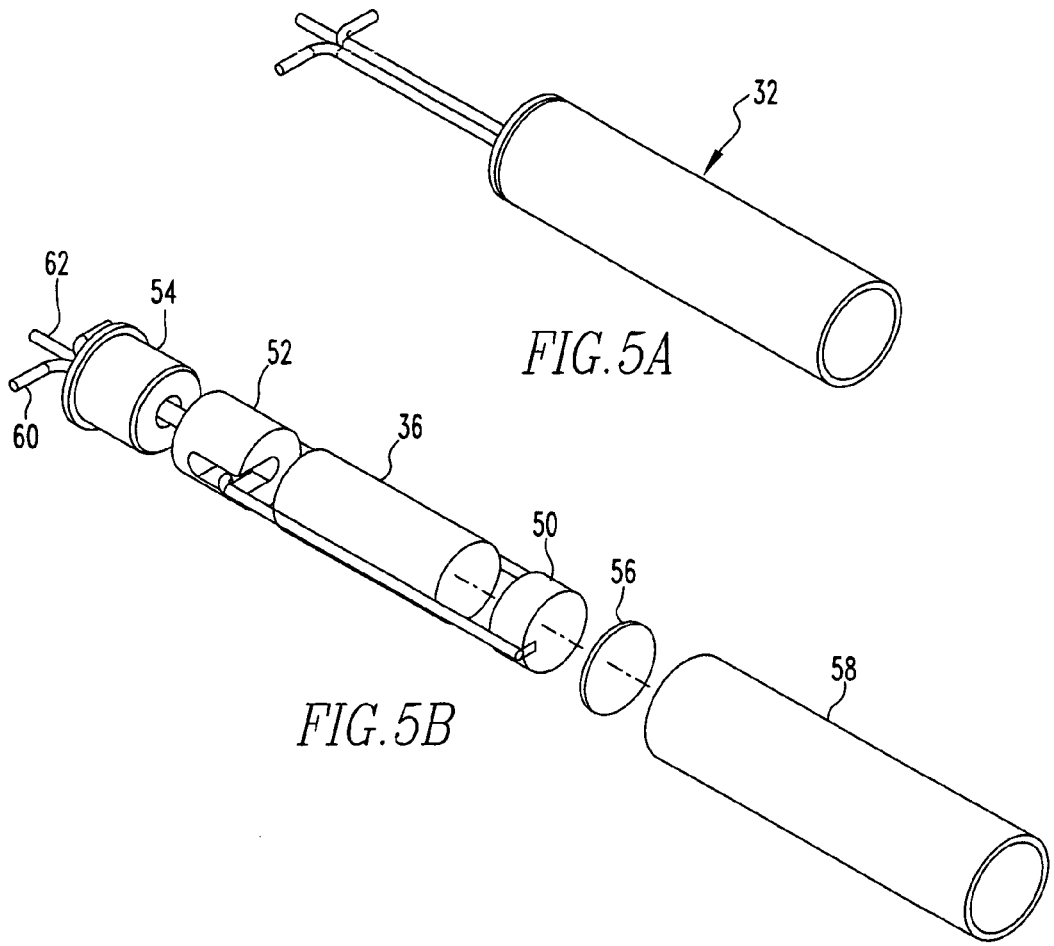
FIG.5A
FIG.5B
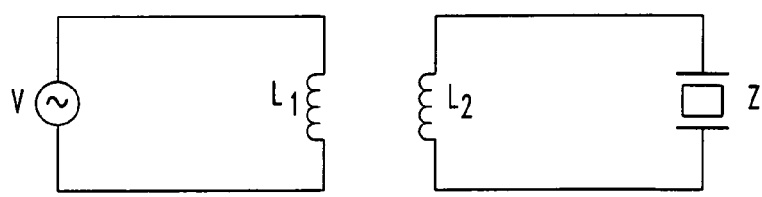
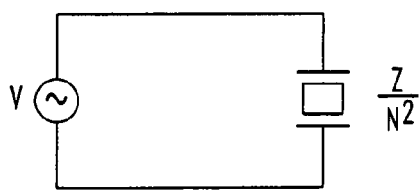
FIG.6

CEESI Iowa Flow Calibration
CALIBRATION RESULTS

Customer : Cameron Technologies
Serial Number : 101006001
Sales Order # : N/A
Purchase Order # : 4502529806
Date : 15-Oct-10
Flow Conditioning : No Flow Conditioning
Flow Direction = Forward

| Meter I.D. | Meter I.D. |
|---|---|
| m | in |
| 0.5477 | 21.5630 |

Please clear out the "Calibration Factor" and "Flow Rate" cells below if not using data point for calibration.

Please select the cal type below

Cal Method : PWL

| Data Point | Calibration Factor | Flow Rate ft3/hr Prover | Flow Rate ft3/hr Meter | Flow Rate m3/hr Prover | Flow Rate m3/hr Meter | Velocity m/sec $V_p$ | Velocity ft/sec $V_p$ | Velocity m/sec $V_m$ | Velocity of ft/sec $V_m$ |
|---|---|---|---|---|---|---|---|---|---|
| 1 | 1.0024 | 919047.0 | 916847 | 26024.52 | 25962.21 | 30.683 | 100.668 | 30.610 | 100.43 |
| 2 | 1.0009 | 685737.0 | 685120 | 19417.91 | 19400.45 | 22.894 | 75.112 | 22.874 | 75.04 |
| 3 | 1.0000 | 459901.0 | 459901 | 13022.95 | 13022.95 | 15.354 | 50.375 | 15.354 | 50.38 |
| 4 | 1.0000 | 230187.0 | 230194 | 6518.17 | 6518.37 | 7.685 | 25.213 | 7.687 | 25.21 |
| 5 | 1.0000 | 92338.4 | 92338 | 2614.73 | 2614.73 | 3.083 | 10.114 | 3.083 | 10.11 |
| 6 | 0.9997 | 50378.2 | 50394 | 1426.55 | 1427.01 | 1.682 | 5.518 | 1.682 | 5.52 |
| 7 | 0.9989 | 23863.4 | 23490 | 675.74 | 676.48 | 0.797 | 2.614 | 0.798 | 2.62 |
| 8 | | | | | | | | | |
| 9 | | | | | | | | | |
| 10 | | | | | | | | | |
| 11 | | | | | | | | | |
| 12 | | | | | | | | | |
| SUMS | 7.001850 | | 2458684.27 | | | | | | |

Note : Velocity of Prover (Vp) is calculated based upon Prover flow rates from CEESI reference turbine meters.

Linearity (As Found) = ± 0.175 %    Linearity = 1/2 Peak-to-Peak of Error    Peak-to-Peak Error = 0.350%
Linearity (As Left) = ± 0.000 %                                                Peak-to-Peak Error = 0.000%

FIG. 7A    TO FIG. 7B

| As Found error % | As Left error % | Verification Vel ft/sec $V_p$ | Verification Results % |
|---|---|---|---|
| -0.24 | 0.000 | | |
| -0.09 | 0.000 | | |
| 0.00 | 0.000 | 60.037 | -0.011 |
| 0.00 | 0.000 | | |
| 0.00 | 0.000 | 20.568 | -0.002 |
| 0.03 | 0.000 | | |
| 0.11 | 0.000 | | |

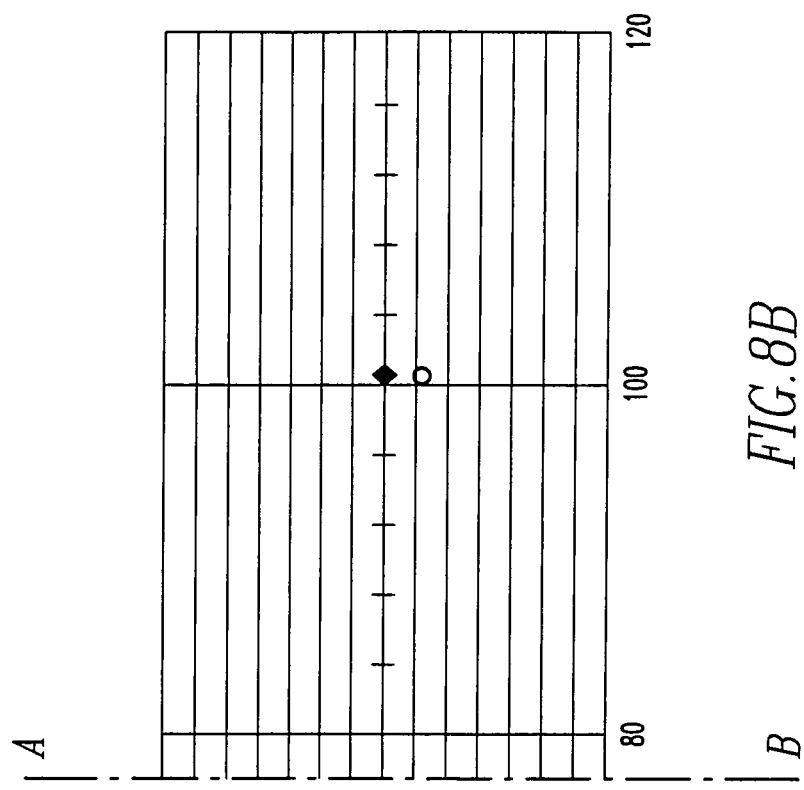

CHORDAL GAS FLOWMETER WITH TRANSDUCERS INSTALLED OUTSIDE THE PRESSURE BOUNDARY, HOUSING AND METHOD

CROSS-REFERENCE TO RELATED APPLICATIONS

This is a continuation-in-part application of U.S. patent application Ser. No. 12/927,616 filed Nov. 19, 2010.

FIELD OF THE INVENTION

The present invention is related to a flowmeter that determines gas flow rates in a pipe by means of ultrasonic transducers that send and receive signals into and from the gas flow through a window made of a pressure containing material that is in acoustic communication with a channel in which the gas flows. (As used herein, references to the "present invention" or "invention" relates to exemplary embodiments and not necessarily to every embodiment encompassed by the appended claims.) More specifically, the present invention is related to a flowmeter that determines gas flow rates in a pipe with ultrasonic transducers that send and receive signals into and from the gas flow through a window made of a pressure containing material that is in acoustic communication with a channel in which the gas flows where the transducers are disposed in housings that acoustically isolate the transducers so as to improve the signal-to-noise ratio of the received acoustic signal.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Ultrasound transducers are used to transmit and receive ultrasonic signals in a flowmeter system. Several problems were solved by using the present invention, they are: The ability to remove or repair transducers from existing ultrasonic flow meters required either depressurizing the pipe gas line or the use of special tools for transducer replacement; transducers not in direct contact with the gas contained in the pipe usually have poor transducer performance resulting in poor signal detection for gas meters. Current ultrasonic gas meters use gas "wetted" transducers, that is, the transducer itself is in direct contact with the gas and cannot be removed without special tools or the elimination of the pressure in the pipe. Traditional transducer housings that put the transducer outside of the pipe pressures, such as those are used in liquid meters, have not been used since the acoustic losses through the housings combined with the noise produced by the mounting of the transducer housings make the acoustic signals unusable. The traditional transducer housings do not work in a gas environment for two reasons. First, conventional transducer housings had thick metal windows that poorly match the acoustic impedance of gas and therefore would not transmit sound into the gas. Second, the traditional transducer housings are rigidly attached to the meter body. These rigid attachments provide pathways for sound to be transmitted through the meter body and not through the gas resulting in poor signal to noise ratios.

The current ultrasonic gas meters have their wetted transducers exposed to the gas which can contain hydrogen sulfide or other contaminants. Hydrogen sulfide can over time deteriorate transducers made of conventional solder joints and epoxies for electrical and mechanical connections within the transducer. In current ultrasonic gas meters, a metal seal is placed behind the transducer in order to maintain the pipe pressure and to prevent gas from leaking out. So if a transducer fails, the transducer has to be replaced using special tools that prevent the transducer from bursting out of the flowmeter at high speeds due to pipe gas pressure. This may be deadly to the replacer if the tools are improperly handled because the transducer becomes a projectile under pipe gas pressure. In addition, the escaping gas is usually highly flammable, presenting an extreme hazard to the replacer and others nearby. If the gas pipeline/process is depressurized to replace transducers for safety reasons the pipeline flow ceases causing lost revenue.

Current gas meter transducers use either a monolithic PZT ceramic transducer or a Tonpilz transducer. These transducers suffer from poor bandwidth, poor signal to noise ratio and radial modes in the 100 to 300 kHz frequency range, the preferred ultrasonic operating frequency range for gas meters. As a result, the received signals can be very distorted. This results in poor transit time measurements and poor accuracy of a gas flowmeter Current gas meters also have metal to metal contact between parts even with wetted transducers when cases enclosing the transducers are made of metal so the flow meter can suffer from poor signal to noise ratio due to acoustic noise of the system.

BRIEF SUMMARY OF THE INVENTION

The present invention pertains to a flowmeter for measurement of gas where accuracy and reliability are essential. The flowmeter measures gas flow rates in a pipe having a channel disposed in the pipe through which gas in the pipe flows and plane waves generated by multiple upstream ultrasonic transducers and multiple downstream ultrasonic transducers propagate. The arrangement of the transducers defines two crossing planes but may have more or fewer. An important feature of this meter is that the transducer elements can be safely checked or replaced without special tools and without depressurizing the line because of housings which hold the transducer and contain the pipe pressure.

BRIEF DESCRIPTION OF THE SEVERAL VIEWS OF THE DRAWING

In the accompanying drawings, the preferred embodiment of the invention and preferred methods of practicing the invention are illustrated in which:

FIG. 5a shows a gas transducer.

FIG. 5b shows an exploded view of a gas transducer.

FIG. 6 shows the transformer application.

FIGS. 7a and 7b, which together are one continuous drawing, show a demonstration of transit time flow meter performance.

FIGS. 8a and 8b, which together are one continuous drawing, show error vs. velocity in regard to the claimed invention.

DETAILED DESCRIPTION OF THE INVENTION

Figure 1:
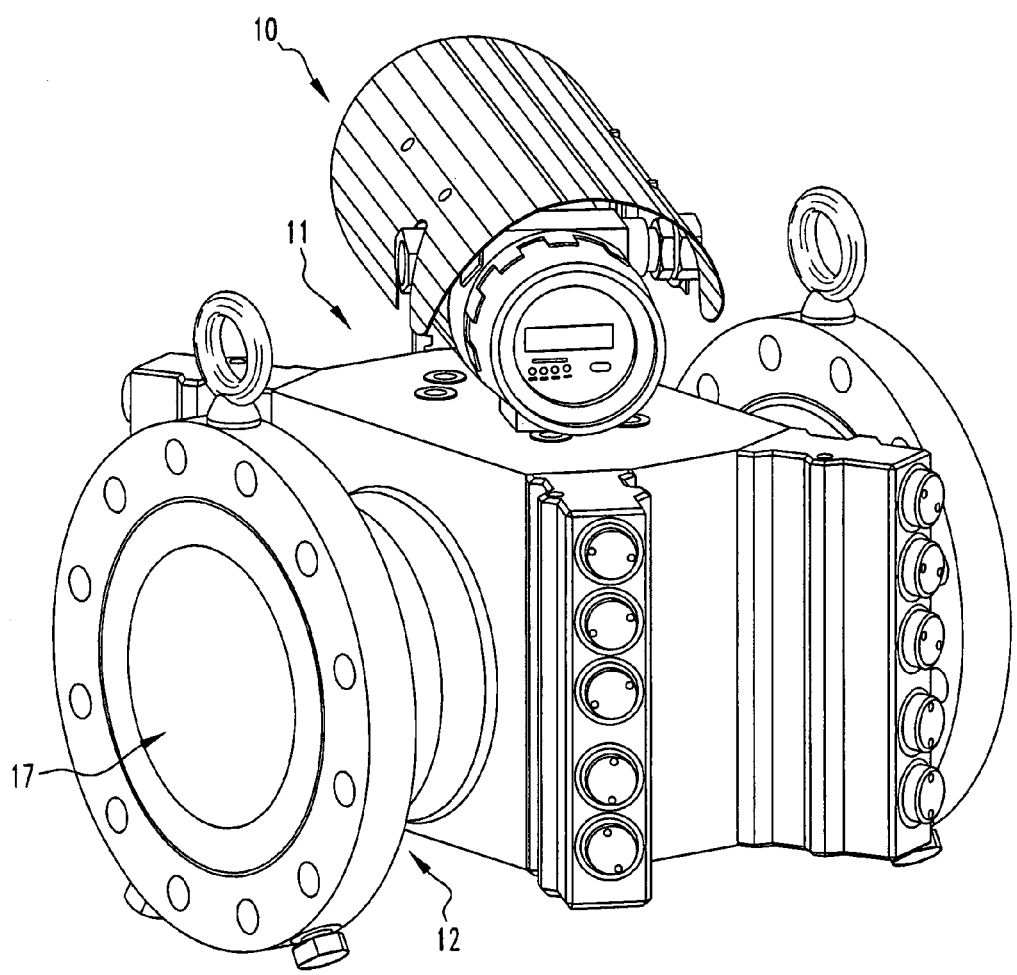
FIG. 1 shows a flowmeter of the present invention.
Figure 2:
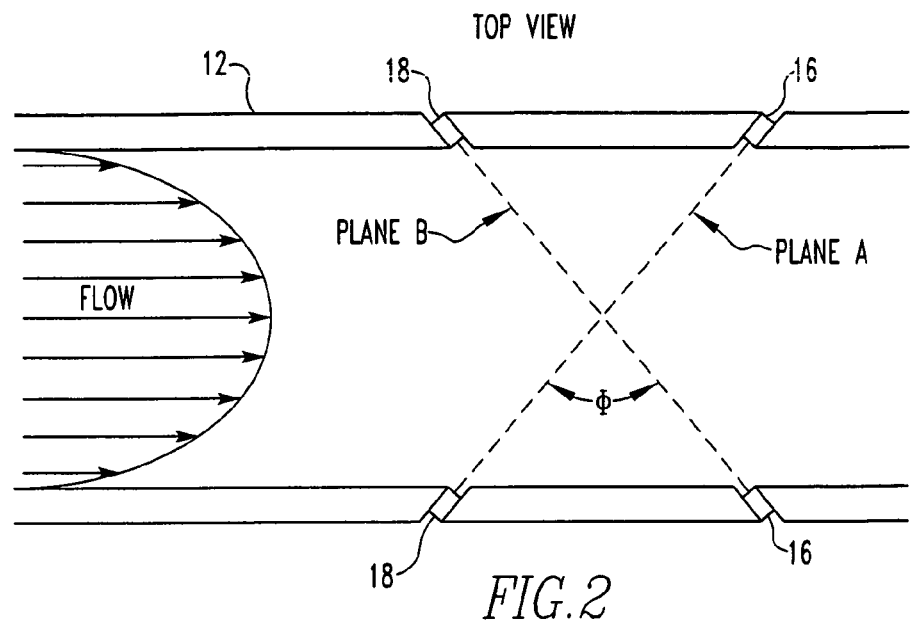
FIG. 2 shows a flowmeter top section of two crossing planes (A and B).
Figure 3:
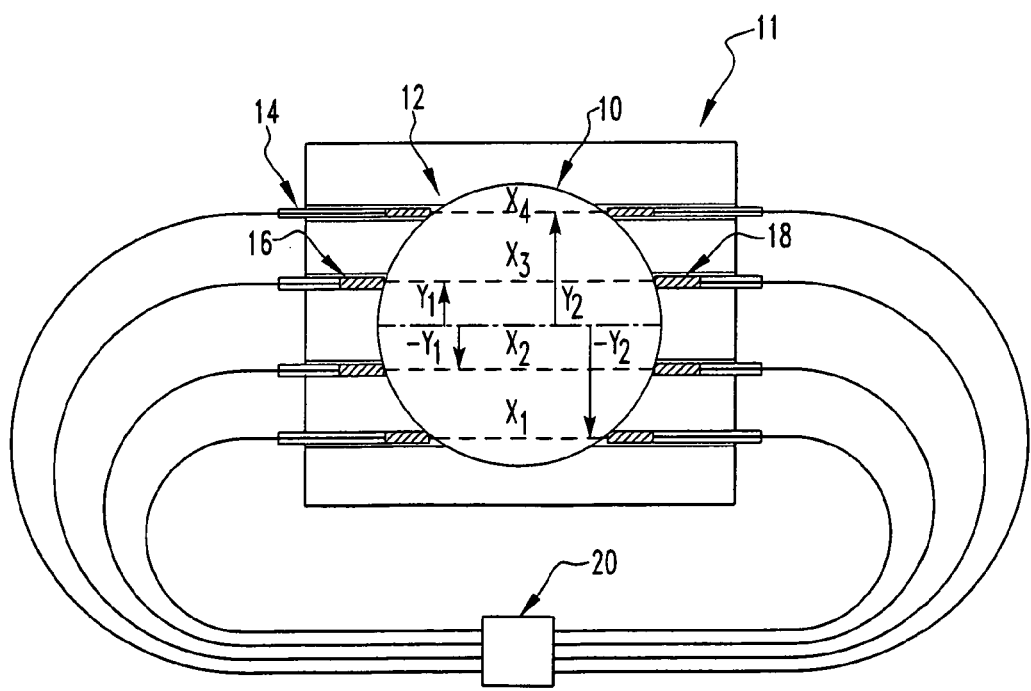
FIG. 3 shows a flowmeter cross section of along either Plane A or Plane B.

Referring now to the drawings wherein like reference numerals refer to similar or identical parts throughout the several views, and more specifically to FIGS. 1-3 thereof, there is shown a flowmeter 10 for detecting gas flow rates in a pipe 12. The flowmeter 10 comprises a container 11 configured to be attached to the pipe 12 having a channel 17 through which the gas flows, and a plurality of recesses 15 that extend through the container 11 and a plurality of housings 14. Each recess 15 has a housing 14 which contains pressure in the channel 17. Each housing 14 has a window 24 that is in acoustic communication with the channel 17. The flowmeter 10 comprises a plurality of transducers 32, with one transducer 32 of the plurality of transducers 32 disposed in each recess 15. The transducers 32 transmit ultrasonic signals into and receive ultrasonic signals from the channel 17 through the window 24 in the housing 14 in which a transducer 32 is disposed. The flowmeter 10 comprises a controller 20 in electrical communication with the plurality of transducers 32 which determines the gas flow rate through the channel 17 by measuring transit times of signals transmitted by and received by the transducers 32.

The window 24 may have a thickness less than ¼ wavelength of ultrasound in the window's material. The window 24 thickness may be about $\frac{1}{10}$ wavelength of ultrasound in the window's material. One transducer 32 of the plurality of transducers 32 may be disposed in each housing 14 disposed in each recess 15. The housing 14 may be a pressure boundary which contains the pressure in the channel 17 and essentially prevents gas in the channel 17 from escaping into the housing 14. The housing 14 forms a gas tight seal with the channel 17.

The transducers 32 may be removed from the recesses 15 without having to depressurize the pipe 12 or having to use an extraction tool that removes the transducers 32 through a pressure containing component that would contain the pressure in the channel 17. The ultrasonic signals transmitted and received by the transducers 32 may define a first path in a first plane and a second path in a second plane which paths cross in the channel 17.

The flowmeter 10 may include acoustic isolators 22 which acoustically isolate the transducer housings 14 from the container 11. The transducer 32 may couple to the window 24. The window 24 is made of metal or plastic. The window 24 may be made of titanium, PEEK or PPS.

Each transducer 32 may be a broad band piezoelectric composite transducer 32 with a coupling coefficient greater than 0.7 out of 1 and an acoustic impedance of less than 34 Mrayls.

Figure 4:
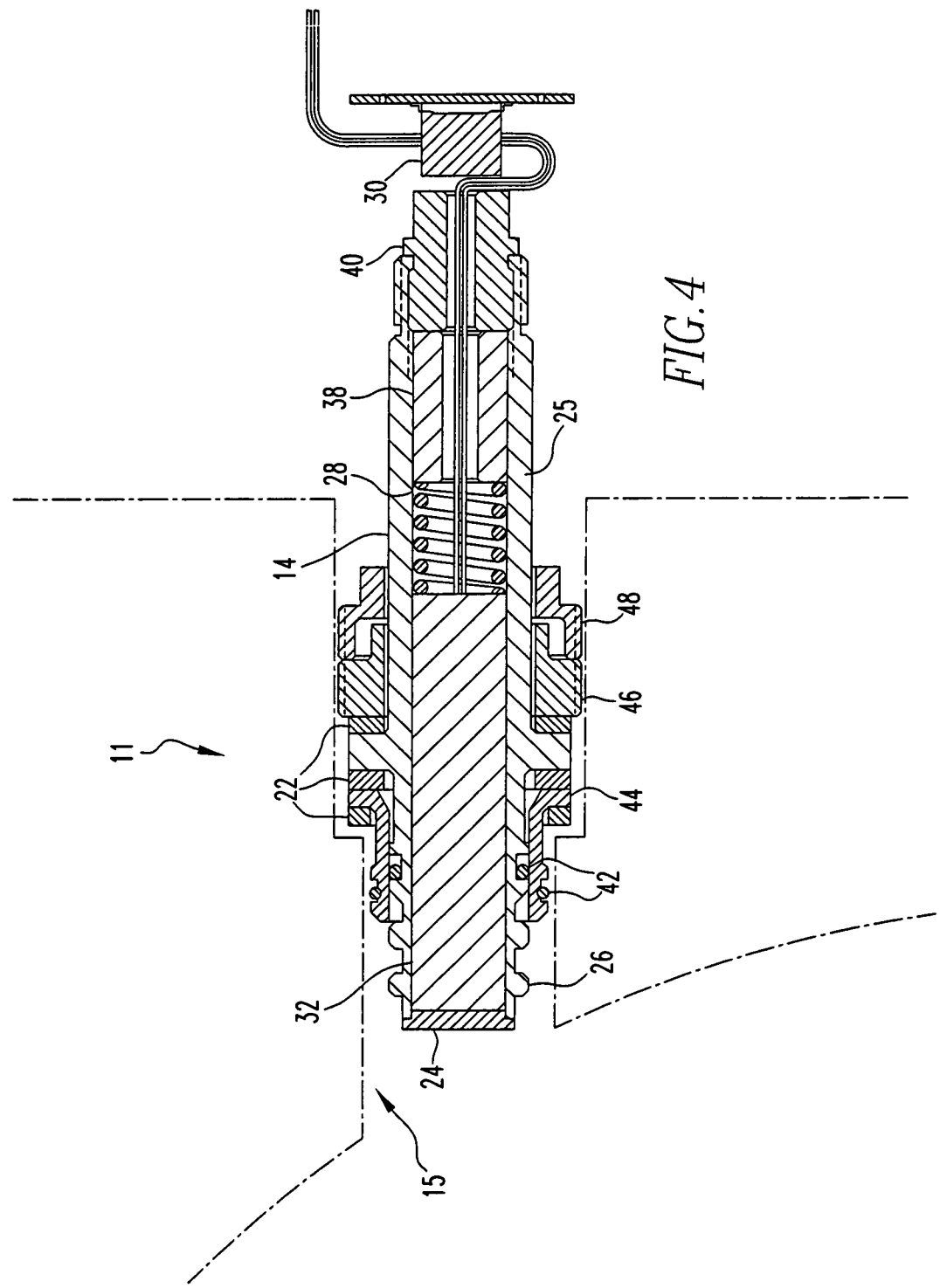
FIG. 4 shows a gas meter arrangement.

The present invention pertains to a housing 14, as shown in FIG. 4, for an ultrasonic transducer 32 for a flowmeter 10 which is inserted into a recess 15 of a container 11 through which gas flows. The housing 14 comprises a shell 25 in which the transducer 32 is disposed. The shell 25 has an outer surface and a flange 34 that extends from the outer surface of the shell 25 and a plurality of acoustic ribs 26 disposed in proximity to an end of the shell 25 from which signals are emitted by the transducer 32. The shell improves the signal-to-noise ratio to greater than 100:1, the ribs attenuate all non-gas paths of sound by at least 25%.

The housing 14 may include an acoustic isolator 22 disposed about the housing 14, which isolator contacts the container 11 and the housing 14 when the transducer 32 is disposed in the recess 15 of the container 11, with the acoustic isolator 22 disposed between the container 11 and the housing 14 so the housing 14 does not contact the container 11. The acoustic isolator 22 may include discs disposed about the flange 34 of the housing 14. The discs may be made of plastic, syntactic foam or rubber. Impedance matching material may not be used on the exterior surface to improve transmission of signals from the transducer 32 into the gas, but uses a window 24 thickness less than ¼ wave length, which makes the window 24 acoustically transparent. There may be no metal to metal contact between the housing 14 and the container 11.

The present invention pertains to a method for detecting gas flow rates in a pipe 12. The method comprises the steps of transmitting ultrasonic signals from a plurality of transducers 32 disposed in recesses 15 in a container 11 attached to the pipe 12 through a window 24 made of metal of each recess 15 into a channel 17 of the container 11 in which the gas flows, with one transducer 32 of the plurality of transducers 32 disposed in each recess 15 and the window 24 in acoustic communication with the channel 17. There is the step of receiving ultrasonic signals from the channel 17 through the windows 24 by the transducers 32 in the recesses 15. There is the step of determining the gas flow rate through the channel 17 by measuring transit times of the signals transmitted by and received by the transducers 32 with a controller 20 in electrical communication with the plurality of transducers 32.

The window 24 may be a pressure boundary which contains the pressure in the channel 17 and prevents gas in the channel 17 from escaping into the housing 14, the window 24 forming a gas tight seal with the housing 14, and there may be the step of replacing a transducer 32 without depressurizing the channel 17 or without using an extraction tool that removes a transducer 32 through a pressure containing component that would contain the pressure in the channel 17.

The transmitting step may include the step of transmitting ultrasonic signals by the transducers 32 along a first path in a first plane and a second path in a second plane which cross in the channel 17 and the receiving step may include the step of receiving ultrasonic signals by the transducers 32 from the first path and from the second path. There may be the step of acoustically isolating housings 14 in which the transducers 32 are disposed in the recesses 15 from the container 11 with acoustic isolators 22. There may be the step of applying a force against the transducer 32 to hold the transducer 32 in contact with the window 24.

The transmitting step may include the steps of generating with an upstream ultrasonic transducer 32 of the first path plane waves that propagate through the channel 17 and are received by a downstream ultrasonic transducer 32 of the first path; producing a downstream transducer 18 signal with the downstream transducer 18 from the plane waves the downstream transducer 18 receives; generating with the downstream ultrasonic transducer of the first path plane waves that propagate through the channel 17 and are received by the upstream ultrasonic transducer of the first path; producing an upstream transducer 16 signal with the upstream transducer 16 from the plane waves the upstream transducer 16 receives; and determining with the controller 20 the gas flow rate from transit times of the signals generated and received by the upstream transducer 16 and downstream transducer 18.

The replacing step may include the step of replacing the transducer 32 without using an extraction tool that removes the transducer 32 through a pressure containing component that provides a gas tight, pressure-bearing enclosure, within which the transducer 32 can be unfastened from the container 11 and allowing the gas in the channel 17 to fill the enclosure without leaking into an external environment about the container 11. The replacing step may include the step of replacing the transducer 32 without using a valve to seal the recess 15 from which the transducer 32 is removed thereby allowing the enclosure within the extraction tool to be vented.

Unlike the present invention, in a design in which the transducer itself is immersed in the gas, the extraction tool performs the following functions:

1. It provides a gas tight, pressure-bearing enclosure, within which the exterior of the transducer assembly can be unfastened from the container (thereby breaking the normal pressure barrier) and allowing the enclosed gas to fill the extraction tool enclosure without leaking into the external environment.
2. It provides the means to withdraw the transducer assembly within the extraction too.
3. It provides the means—usually a valve—to close off the opening left vacant by the removal of the transducer assembly, thereby allowing the enclosed space within the extraction tool to be vented and the enclosed (presumably defective) transducer assembly to be removed.
4. It provides the means to put in place a fully functional transducer assembly within the enclosed space of the extraction tool.
5. It provides the means to insert the new transducer into the container, fasten it in place and test the transducer assembly/container joint for tightness, whereupon the extraction tool can be removed.

The present invention pertains to a transducer 32, as shown in FIG. 5, for an ultrasonic flowmeter 10. The transducer 32 comprises a case 58. The transducer 32 comprises a broad band piezoelectric composite 50 disposed in the case 58 with a coupling coefficient greater than 0.7 out of 1 and an acoustic impedance of less than 34 Mrayls.

The transducer 32 may include a transformer 30 which matches the transducer's electrical impedance.

In another embodiment, the housing 14 and transducer 32 described herein, as well as the overall technique described herein, may be applied directly to a pipe 12 where the recesses 15 are formed in the pipe 12 and the housings 14 with transducers 32 are inserted into the recesses 15 in the pipe 12 itself.

In the operation of the invention, the flowmeter 10 is capable of measuring gas flow rates with ultrasonic transit time technology. The application is specifically applied to natural gas metering. A novel aspect of the flowmeter 10 is the transducer housing 14 which has a pressure containing window 24 less than 1/10 of a wavelength of the ultrasound of the window 24 material in thickness but nevertheless complies with the strength and tightness requirements imposed by the full pressure of the gas on its exterior. The preferred window 24 is a titanium window 24. The titanium window 24 is thin enough such that it is nearly acoustically transparent, it serves as a hermetic seal from the natural gas which may contain hydrogen sulfide or other contaminants, and it acts as a pressure barrier to the gas in the pipe 12. A wavelength ($\lambda$) of titanium at 200 kHz is 30.35 mm when the speed of sound in the material is 6070 m/s. The titanium window 24 is laser welded to the titanium transducer housing 14. Laser welding is a low heat process compared to torch welding therefore there is no damage to the mechanical integrity of the $\lambda/10$ thick (3 mm) titanium window 24 to the housing 14. The window 24 serves to maintain the mechanical integrity of the transducer housing 14 by being a pressure barrier from the pressurized gas. Typical operation pressure ratings range from below 475 psi (ANSI 150) to 3,705 psi (ANSI 1500). The operating temperatures range from −40 C to 100 C. The gas flow meter has replaceable transducers 32 without having to depressurize the line. All transducer housings 14 have acoustic ribs 26 which are spaced $\lambda/8$ to $\lambda/4$ apart to isolate and cancel the acoustic noise of the transducer housing 14 and breakup the transducer housing 14 resonance. In addition, all transducer housings 14 are acoustically isolated from the meter body by acoustic isolators 22.

Special transducers 32 have been fabricated using composite piezoelectric technology. The composite piezoelectric material has a $k_t$ of 0.75 and low Z of 17 MRayls. This enables broad band performance for an easily detectable leading edge for precise time measurements. Each transducer 32 uses a 7:1 impedance matching transformer 30 which improves signal strength by 17 dB. This transducer arrangement coupled to a titanium window 24, $\lambda/10$ is desired for performance of an ultrasonic gas meter that uses a window 24 as a pressure barrier greater than 3,705 psi.

A flowmeter 10 for detecting gas flow rates in a pipe 12 preferably includes multiple paths disposed in the pipe 12 through which gas in the pipe 12 flows. The upstream transducer 16 is in contact with the titanium window 24 within the transducer housing 14 and positioned such that plane waves generated by the upstream transducer 16 propagates through the channel 17. The downstream transducer 18 is acoustically isolated from the pipe 12 and positioned such that plane waves generated by the downstream transducer 18 propagate through the channel 17 and are received by the upstream transducer 16, which produces an upstream transducer 16 signal that is provided to a controller 20. The downstream transducer 18 receives the plane waves from the upstream transducer 16, and provides a downstream transducer 18 signal that is provided to the controller 20. The flowmeter 10 includes a signal processor, otherwise known as the controller 20, in communication with the upstream and downstream transducers 16, 18 which determines the gas flow rate through the channel 17 by measuring transit times of signals transmitted by and received by the transducers.

Referring to FIGS. 1-3, the flowmeter 10 comprises a channel 17 disposed in the pipe 12 through which gas in the pipe 12 flows. The flowmeter 10 comprises multiple paths. Multiple upstream ultrasonic transducers 16 within transducer housings 14 acoustically isolated from the pipe 12 and positioned so plane waves generated by an upstream transducer 16 propagate through the channel 17. Each path comprises a downstream ultrasonic transducer 18, within a transducer housing 14 acoustically isolated from the pipe 12 and positioned so plane waves generated by the downstream transducer 18 propagate through the channel 17 and are received by the upstream transducer 16 which produces an upstream transducer 16 signal. The downstream transducer 18 receives the plane waves from the upstream transducer 16 and provides a downstream transducer 18 signal. The flowmeter 10 comprises a controller 20 in communication with the upstream and downstream transducers 16, 18 which determines the gas flow rate through the channel 17 by measuring transit times of signals transmitted by and received by the transducers.

The transducer housing 14 is preferably made of titanium which is corrosion resistant to natural gas contaminants such as hydrogen sulfide. The upstream transducer 16 and the downstream transducer 18 are coupled to a window 24 within the transducer housing 14. The transducer housings 14 are acoustically isolated by acoustic isolators 22 which contact the pipe 12. The window 24 forms a seal with the transducer housing 14 preventing gas in the pipe 12 leaking into the transducer housing 14. The window 24 which is inclusive of the transducer housing 14 is sealed via laser welding such that hydrogen sulfide cannot leak inside. The transducer 32 couples to the acoustic window 24 using a couplant, preferably a silicone grease. A spring assembly 28 applies pressure to the transducer 32 in order to couple the ultrasonic signal more effectively to the window 24. A spacer 38 and compression nut 40 compress the spring assembly 28 such that at least 100 psi is applied to the transducer 32. O-rings 42 are placed around the transducer housing 14 and a bushing 44 in order to create another gas tight seal between the transducer housing 14 and the pipe 12. The bushing 44 provides mechanical support for the transducer housing 14 and positions the transducer housing 14 within the container 11. The load nut 46 and lock nut 48 secure the transducer housing 14 to the container 11 by applying pressure to the acoustic isolators 22 and prevents the transducer housing 14 from being forced out of the container 11 under pipe pressure. There is a gas gap radially disposed between the transducer housing 14 and load nut 46 and lock nut 48 so there is no metal to metal contact between the container 11 and the transducer housings 14. It should be noted that basically, the container 11 with the channel 17 is an extension of the pipe 12 and for all intent and purpose in regard to this invention is considered a part of the pipe 12.

Shown in FIG. 5 is a transducer 32 consisting of a wearface 56, piezocomposite 50 and delay line 36 that is potted in a brass case 58 with a load cylinder 52 and a cap 54. The wearface 56 is made of impedance matching material preferably of high purity alumina ($Al_2O_3$) greater than 96% with a density of around 3.64 gm/cm$^3$, a hardness greater than 1000 Knoops and the thickness $<<\lambda$. The piezocomposite 50 is a 1-3 composite material preferably made from PZT-5H and epoxy (Smart Material Inc., Sarasota, Fla.). The volume fraction of PZT-5H is around 50% this produces a high coupling coefficient, $k_t$ of 0.75 out of 1. Having a high coupling coefficient is necessary because it improves the signal to noise ratio of the ultrasonic signal. The acoustic impedance known as Z=$\rho$v, where density $\rho$ (kg/m$^3$) and velocity v (m/s), is around 17 MRayls. The delay line 36 serves two purposes: as a reflection delay line 36 and as an acoustic attenuator. The delay line 36 is made of metal filings filled with epoxy of at a low volume fraction, typically 15%. The delay line 36 is long enough such that the reflection is more than several wavelengths away from the piezoelectric element. A typical speed of sound for the delay line 36 is 1277 m/s. A wave length in a delay line 36 at 200 kHz is 6.3 mm. A typical length of a delay line 36 for this application is thirty two mm. Therefore, once a signal is received by the transducer 32 it takes a reflection twice the time of a delay line 36 before the reflection is received as reverberation by the transducer 32. In this case the reflection occurs fifty microseconds later than the detectable signal. Attenuation in the delay line 36 is typically, 2.29 dB/cm, so round trip attenuation of a reflected signal would be 14.65 dB. In order to make electrical connections to piezocomposite 50, a (+) wire 60 and a (−) wire 62 are soldered to silver foil which is bonded to the piezocomposite 50 using silver epoxy. The entire transducer 32 is potted with non conductive epoxy in order to encapsulate and insulate all components.

Depending on the specific operating conditions of the meter, a range of frequencies can be used, from 100 kHz to 500 kHz. A broad band composite transducer 32 is preferred for metering gas. Unique to gas applications, when flow rate >60 feet/second is present the acoustic wave is distorted by the flow and the wave front is received by a transducer 32. If a broad band composite transducer 32 is used instead of a typical narrow band monolithic PZT transducer or Tonpilz transducer there is less distortion of the received acoustic wave. The upstream and downstream transit time signals are detected in order to make a flow measurement by the controller 20. The composite transducer 32 has a rising edge of the received ultrasonic pulse that can be more accurately detected by the controller 20 thus calculating a more accurate transit time measurement.

An electrical transformer 30 is put in series with each transducer 32 to match the electrical impedance of the transducer 32 to that of the electronics and cables, FIG. 6. The electronics are represented by an AC voltage V in series with a transformer, $L_1$, the first winding of the transformer and the impedance Z of a transducer is in series with the secondary winding of the transformer, $L_2$. The equivalent circuit is shown when the electronics, V, are directly in series with the impedance Z of the transducer and the impedance is reduced by the number of turns squared, $N^2$. The electrical impedance of each transducer 32 (4900$\Omega$) is reduced $N^2$ by 49 to 100$\Omega$ in order to match to the 100$\Omega$ transmit and receive electronics. Each transducer 32 is spring loaded by the spring assembly 28 inside the transducer housing 14 in order for the wearface 56 to make sufficient mechanical contact to the window 24. Grease is used for acoustic coupling of the transducer 32 to the window 24.

The transducer housing 14 has acoustic ribs 26, acoustic isolators 22, and a window 24. The acoustic ribs 26 are spaced $\lambda/4$ to $\lambda/8$ apart in order to cancel acoustic noise. During the excitation of an ultrasonic transducer 32 which is coupled to the window 24, a low amplitude acoustic wave either longitudinal or shear propagates along the transducer housing 14. The wave propagates according to the wave equation:

$$\frac{d^2 y}{dx^2} = \frac{1}{c^2}\frac{d^2 y}{dt^2}$$

When a longitudinal or shear wave is reflected from a rib interface its phase changes $\omega$=$\pi$ or 180 degrees ~t=T/2 or x=$\lambda$/2, it then interferes with an incoming wave to destructively cancel it. Therefore, $$y(x,t)=y_1(ct-x)-y_1(ct+x)=0$$

Since the ambient noise generated in the transducer housing 14 can be at many frequencies and amplitudes, cancellation is not complete. The noise cancellation improves the signal to noise ratio of the received ultrasound signal up 10 dB.

The acoustic isolators 22 are preferably made of Polyether Ether Ketone (PEEK) disks (thickness >$\lambda$) that fit around the transducer housing 14 between a flange 34. Other low acoustic impedance materials may be used, for example syntactic foam. The acoustic isolators 22 are in contact with the pipe 12 but the flange 34 is not. The total noise loss from noise attenuation can be calculated using transmission equations using the following formula:

$$\text{Loss (dB)} = 20\log 10\left(\frac{p_o}{p_{in}}\right) = \frac{16 * (z_{peek})^2 z_{steel} Z_{Ti}}{(z_{peek} + z_{Ti})^2 (z_{peek} + z_{steel})^2}$$

Where $P_o$ is pressure output, $P_{in}$ pressure input, $Z_{peek}$, the acoustic impedance of PEEK is 3 Mrayls, $Z_{steel}$, the acoustic impedance of Steel is 45 Mrayls, and $Z_{Ti}$, the acoustic impedance of Titanium is 30 Mrayls. The loss calculation is 22 dB but more loss is possible since the PEEK, steel and titanium parts are pressed together and not mechanically bonded.

The window 24 is less than wavelength thick such that it becomes virtually acoustically transparent at operating frequencies. According to transmission line theory the acoustic impedance of material becomes closer to that acoustic impedance the thinner it becomes. When the thickness of the titanium window 1 is $\lambda/10$ of titanium, the acoustic energy transmits through the window 24 into gas without signal distortion. The equation for transmission line theory is:

$$Z_W = Z_{Ti} \frac{Z_A + jZ_{Ti}\tan(\beta l)}{Z_{Ti} + jZ_A\tan(\beta l)}$$

$Z_A$: Acoustic Impedance of Air
$Z_{Ti}$: Acoustic Impedance of Titanium
$Z_w$: Acoustic Impedance of the window 24 of thickness 1
$C_{Ti}$: Speed of Sound in Titanium
f: Frequency of ultrasound wave
$\lambda = C_{Ti}/f$: Wavelength in Titanium
$\beta = 2\pi/\lambda$ Since titanium has lower acoustic impedance than steel (typical material of gas pipes), it is the best metal to use acoustically that is resistant to hydrogen sulfide and other contaminants.

The ultrasonic flow meter arrangement 10 uses multiple transducers 32 each within a transducer housing 14, there are multiple chordal paths distributed in spacing according to numerical integration rules in order to accurately sample the velocity profile in a pipe 12. A path consists of one transducer 32 upstream from the gas flow and another is downstream from the gas flow, both transducers 32 transmit and receive signals. The difference in transit times between the upstream and downstream signal is used to calculate a velocity per path. The path velocities are integrated by the controller 20 to calculate a flow rate. These equations can be modified for Mach number.

For C>>V:
L: path length
$L_{chord}$: chord path length
$V_{axial}$: axial gas velocity
Q: Volume flow
D: diameter of opening
φ: path angle
$t_1$: upstream transit time
$t_2$: downstream transit time
$\Delta t$: $t_2 - t_1$
$V_{path}$: gas velocity per path
$w_i$: Weighting factor per path $$Q = \int\int_{cross\ section} v_{axial}(x,y)dxdy$$

$$L_{path}V_{path} = \frac{1}{2}\frac{L_{path}^2 \Delta t}{t_2 t_1}$$

$$V_{path} = V_{axial}\sin\varphi$$

$$L_{path} = \frac{L_{chord}}{\cos\varphi}$$

$$V_{axial}L_{chord} = \frac{1}{2}\frac{L_{path}^2 \Delta t}{t_2 t_1 \tan\varphi}$$

In order directly to measure volumetric flow, one must integrate the axial fluid velocity over a cross section normal to the pipe 12 axis. In order to solve for the speed of sound in gas and gas velocity, the upstream and downstream transit times need to be measured via a controller 20. The controller 20 computes the transit time differences between the upstream and downstream transit times per path length. The $V_{axial}L_{chord}$ product is exactly the line integral of $V_{axial}dy$ at a chord location. The $V_{axial}L_{chord}$ product is calculated for each location $x_1$, $x_2$, $x_3$, $x_4$ in FIG. 3, effectively dividing the pipe 12 cross-section into four segments per plane. The effective width of each segment is a fraction of the internal diameter, D, measured along the x axis. Either Legendre or Jacobian/Chebychev spacing or weighting are used for chordal flowmeters, the path locations y, and weighting factors w were not chosen arbitrarily but comply with numerical integration rules. The spacing is measured from the center of the pipe 12, the spacing $y_1$, $y_2$, $-y_1$, $-y_2$ is shown in Table 1 along with the weighting factors. The length of each chord is known either by calculation or measurement.

TABLE 1

Flowmeter Path Spacing and Weighting Factors

| Location y-axis | Legendre Spacing | Legendre weighting | Jacobian/ Chebychev Spacing | Jacobian/ Chebychev weighting |
|---|---|---|---|---|
| $y_1$ | .34 * Diameter/2 | .77 | .30 * Diameter/2 | .72 |
| $y_2$ | .86 * Diameter/2 | .22 | .80 * Diameter/2 | .27 |
| $-y_1$ | -.34 * Diameter/2 | .77 | -.30 * Diameter/2 | .72 |
| $-y_2$ | -.86 * Diameter/2 | .22 | -.80 * Diameter/2 | .27 |

The flow Q can now be calculated by the following equation:

$Q = D[w_1 Lchord_1 vaxial_1 + w_2 Lchord_2 vaxial_2 + w_3 Lchord_3 vaxial_3 + w_4 Lchord_4 vaxial_4]$.

where $w_1 = w_4$ and $w_2 = w_4$; $Lchord_1 = Lchord_4$, $Lchord_2 = Lchord_3$.

A 24 inch diameter (21.56" ID) ultrasonic gas flowmeter 10 with eight paths was fabricated as described in this invention and calibrated to a known standard at the CEESI gas calibration facility in Iowa. Results show (FIG. 5) the percent error as function of a range of velocities from 2 ft/s to 100 ft/s. Native linearity (that is; the 24 inch meter linearity without correction) was determined to be only +/-0.175%. The pipe 12 is fabricated from carbon steel in accordance ASME B31.3 Process Piping Code. The controller 20 is designed in compliance to UL/cUL Class 1, Division 1, Groups C & D.

The meter sizes, flowrates and velocities are described in Table 2. Flowrates shown are based on schedule 40 pipe ID. Over-range flowrates are at 120 fps.

TABLE 2

Meter Sizes, Flowrates, and Velocities

| Meter Size | | Flow Rate—ft³/hr | | | Flow Rate—m³/hr | | |
|---|---|---|---|---|---|---|---|
| Inches | DN | Min | Max | Over-range | Min | Max | Over-range |
| 8 | 200 | 2,500 | 125,000 | 150,000 | 71 | 3,550 | 4,250 |
| 10 | 250 | 3,950 | 197,000 | 237,000 | 110 | 5,580 | 6,700 |
| 12 | 300 | 5,600 | 280,000 | 336,000 | 160 | 7,900 | 9.500 |
| 16 | 400 | 8,850 | 442,000 | 530,000 | 250 | 12,500 | 15,000 |

TABLE 2-continued

| Meter Sizes, Flowrates, and Velocities | | | | | | | |
|---|---|---|---|---|---|---|---|
| Meter Size | | Flow Rate—ft$^3$/hr | | | Flow Rate—m$^3$/hr | | |
| Inches | DN | Min | Max | Over-range | Min | Max | Over-range |
| 20 | 500 | 13,900 | 695,000 | 834,000 | 400 | 19,700 | 23,600 |
| 24 | 600 | 20,100 | 1,010,000 | 1,210,000 | 570 | 28,500 | 34,200 |

Figure 8A:
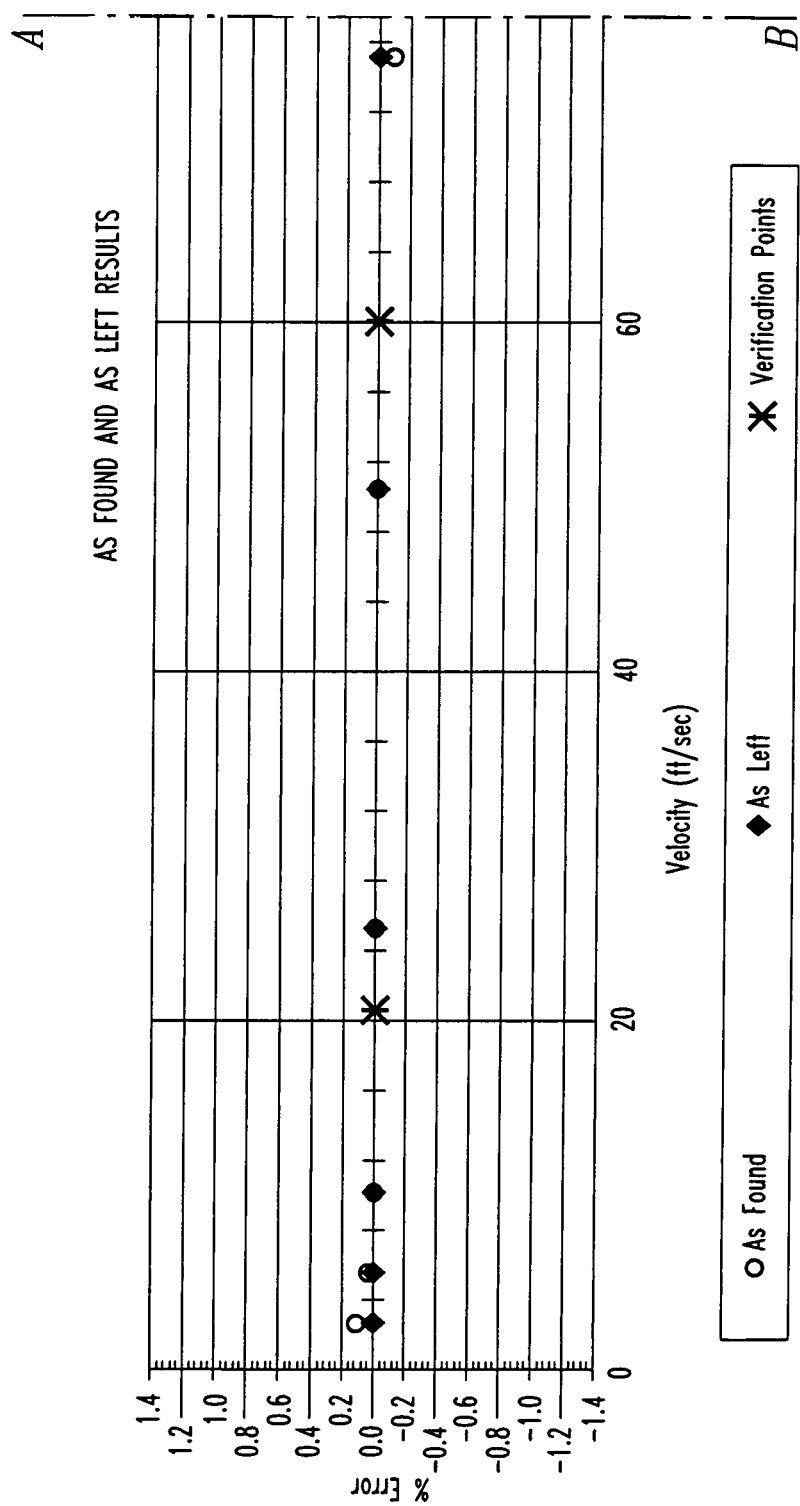

FIG. 6 shows the transformer application. FIGS. 7a and 7b, which together are one continuous drawing, show a demonstration of transit time flow meter performance. FIGS. 8a and 8b, which together are one continuous drawing, show error vs. velocity in regard to the claimed invention.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A flowmeter for detecting gas flow rates in a pipe comprising:
a container configured to be attached to the pipe having a channel through which the gas flows, and a plurality of recesses that extend through the container and a plurality of housings, each recess having a housing which contains pressure in the channel, each housing having a window that is in acoustic communication with the channel;
a plurality of transducers, with one transducer of the plurality of transducers disposed in each recess, the transducers transmitting ultrasonic signals into and receiving ultrasonic signals from the channel through the window in the housing in which a transducer is disposed; and
a controller in electrical communication with the plurality of transducers which determines the gas flow rate through the channel by measuring transit times of signals transmitted by and received by the transducers.

2. The flowmeter as described in claim 1 wherein the window has a thickness less than ¼ wavelength of ultrasound in the window's material.

3. The flowmeter as described in claim 2 wherein the window thickness is about 1/10 wavelength of ultrasound in the window's material.

4. The flowmeter as described in claim 3 wherein one transducer of the plurality of transducers is disposed in each housing disposed in each recess.

5. The flowmeter as described in claim 4 wherein the housing is a pressure boundary which contains the pressure in the channel and essentially prevents gas in the channel from escaping into the housing, the housing forming a gas tight seal with the channel.

6. The flowmeter as described in claim 5 wherein the transducers can be removed from the recesses without having to depressurize the pipe or having to use an extraction tool that removes the transducers through a pressure containing component that would contain the pressure in the channel.

7. The flowmeter as described in claim 6 wherein the ultrasonic signals transmitted and received by the transducers define a first path in a first plane and a second path in a second plane which paths cross in the channel.

8. The flowmeter as described in claim 7 including acoustic isolators which acoustically isolate the transducer housings from the container.

9. The flowmeter as described in claim 8 wherein the transducer couples to the window.

10. The flowmeter as described in claim 9 wherein the window is made of metal or plastic.

11. The flowmeter as described in claim 10 wherein the window is made of titanium, PEEK or PPS.

12. The flowmeter as described in claim 11 wherein each transducer is a broad band piezoelectric composite transducer with a coupling coefficient greater than 0.7 out of 1 and an acoustic impedance of less than 34 Mrayls.

13. A housing for an ultrasonic transducer for a flowmeter which is inserted into a recess of a container through which gas flows comprising:
a shell in which the transducer is disposed, the shell having an outer surface and a flange that extends from the outer surface of the shell and a plurality of acoustic ribs disposed in proximity to an end of the shell from which signals are emitted by the transducer, the shell improves the signal-to-noise ratio to greater than 100:1, the ribs attenuate all non-gas paths of sound by at least 25%.

14. The housing as described in claim 13 including an acoustic isolator disposed about the housing, which isolator contacts the container and the housing when the transducer is disposed in the recess of the container, with the acoustic isolator disposed between the pipe and the housing so the housing does not contact the container.

15. The housing as described in claim 14 wherein the acoustic isolator includes discs disposed about the flange of the housing.

16. The housing as described in claim 15 wherein the discs are made of plastic, syntactic foam or rubber.

17. The housing as described in claim 16 which does not use impedance matching material on the exterior surface to improve transmission of signals from the transducer into the gas, but uses a window thickness less than ¼ wave length, which makes the window acoustically transparent.

18. The housing as described in claim 17 wherein there is no metal to metal contact between the housing and the container.

19. A method for detecting gas flow rates in a pipe comprising the steps of:
transmitting ultrasonic signals from a plurality of transducers disposed in recesses in a container attached to the pipe through a window made of metal of each recess into a channel of the container in which the gas flows, with one transducer of the plurality of transducers disposed in each recess and the window in acoustic communication with the channel;
receiving ultrasonic signals from the channel through the windows by the transducers in the recesses; and
determining the gas flow rate through the channel by measuring transit times of the signals transmitted by and received by the transducers with a controller in electrical communication with the plurality of transducers.

20. The method as described in claim 19 wherein the window is a pressure boundary which contains the pressure in the channel and prevents gas in the channel from escaping into the housing, the window forming a gas tight seal with the housing, and there is the step of replacing a transducer without depressurizing the channel or without using an extraction tool that removes a transducer through a pressure containing component that would contain the pressure in the channel.

21. The method as described in claim 20 wherein the transmitting step includes the step of transmitting ultrasonic signals by the transducers along a first path in a first plane and a second path in a second plane which cross in the channel and the receiving step includes the step of receiving ultrasonic signals by the transducers from the first path and from the second path.

22. The method as described in claim 21 including the step of acoustically isolating housings in which the transducers are disposed in the recesses from the container with acoustic isolators.

23. The method as described in claim 22 including the step of applying a force against the transducer to hold the transducer in contact with the window.

24. The method as described in claim 23 wherein the transmitting step includes the steps of:

generating with an upstream ultrasonic transducer of the first path plane waves that propagate through the channel and are received by a downstream ultrasonic transducer of the first path;

producing a downstream transducer signal with the downstream transducer from the plane waves the downstream transducer receives;

generating with the downstream ultrasonic transducer of the first path plane waves that propagate through the channel and are received by the upstream ultrasonic transducer of the first path;

producing an upstream transducer signal with the upstream transducer from the plane waves the upstream transducer receives; and determining with the controller the gas flow rate from transit times of the signals generated and received by the upstream transducer and downstream transducer.

25. The method as described in claim 24 wherein the replacing step includes the step of replacing the transducer without using an extraction tool that removes the transducer through a pressure containing component that provides a gas tight, pressure-bearing enclosure, within which the transducer can be unfastened from the container and allowing the gas in the channel to fill the enclosure without leaking into an external environment about the container.

26. The method as described in claim 25 wherein the replacing step includes the step of replacing the transducer without using a valve to seal the recess from which the transducer is removed thereby allowing the enclosure within the extraction tool to be vented.

27. A transducer for an ultrasonic flowmeter comprising:
a case; and
a broad band piezoelectric composite disposed in the case with a coupling coefficient greater than 0.7 out of 1 and an acoustic impedance of less than 34 Mrayls.

28. The transducer as described in claim 27 including a transformer which matches the transducer's electrical impedance.

* * * * *